(12) United States Patent
Bendiks et al.

(10) Patent No.: US 10,308,100 B2
(45) Date of Patent: Jun. 4, 2019

(54) INTERMEDIATE SHELL FOR A MOTOR VEHICLE DOOR, METHOD FOR PRODUCING AN INTERMEDIATE SHELL, AND A DOOR FOR A MOTOR VEHICLE

(71) Applicant: Daimler AG, Stuttgart (DE)

(72) Inventors: Michael Bendiks, Plochingen (DE); Juergen Boesselmann, Riederich (DE)

(73) Assignee: Daimler AG, Stuttgart (DE)

( * ) Notice: Subject to any disclaimer, the term of this patent is extended or adjusted under 35 U.S.C. 154(b) by 624 days.

(21) Appl. No.: 14/762,767

(22) PCT Filed: Dec. 11, 2013

(86) PCT No.: PCT/EP2013/003747
§ 371 (c)(1),
(2) Date: Jul. 22, 2015

(87) PCT Pub. No.: WO2014/114314
PCT Pub. Date: Jul. 31, 2014

(65) Prior Publication Data
US 2015/0352933 A1  Dec. 10, 2015

(30) Foreign Application Priority Data
Jan. 23, 2013 (DE) .................. 10 2012 001 028

(51) Int. Cl.
B60J 5/04 (2006.01)
B23P 15/00 (2006.01)

(52) U.S. Cl.
CPC ............ *B60J 5/0431* (2013.01); *B23P 15/00* (2013.01); *B60J 5/0433* (2013.01); *B60J 5/0455* (2013.01); *B60J 5/0465* (2013.01); *B60J 5/0483* (2013.01); *B23P 2700/50* (2013.01); *Y10T 29/49623* (2015.01); *Y10T 428/12* (2015.01);
(Continued)

(58) Field of Classification Search
CPC .......................... B60J 5/0455; E05Y 2900/45
See application file for complete search history.

(56) References Cited

U.S. PATENT DOCUMENTS

| | | | | |
|---|---|---|---|---|
| 2002/0073627 A1* | 6/2002 | Hock | ..................... | B60J 5/0406 49/502 |
| 2005/0046227 A1* | 3/2005 | White | ..................... | B60J 5/0405 296/146.6 |

(Continued)

FOREIGN PATENT DOCUMENTS

| | | |
|---|---|---|
| DE | 39 34 590 A1 | 4/1991 |
| DE | 43 00 398 A1 | 7/1994 |

(Continued)

OTHER PUBLICATIONS

Kobayashi et al., Metal Forming and the Finite-Element Method, 1989, Oxford University Press, Chapter 2 "Metal-Forming Processes" p. 8+.*

(Continued)

*Primary Examiner* — Jacob J Cigna
(74) *Attorney, Agent, or Firm* — Crowell & Moring LLP

(57) ABSTRACT

An intermediate shell for a motor vehicle door, in particular a side door of a motor vehicle, is disclosed. The intermediate shell is produced at least in regions from a light metal blank by massive forming, preferably by forging.

2 Claims, 1 Drawing Sheet

(52) U.S. Cl.
CPC ................. *Y10T 428/12361* (2015.01); *Y10T 428/12986* (2015.01)

(56) References Cited

U.S. PATENT DOCUMENTS

| | | | | |
|---|---|---|---|---|
| 2005/0102953 | A1* | 5/2005 | Masunaga | B60J 1/17 52/633 |
| 2007/0194604 | A1* | 8/2007 | Nygaard | B60R 21/13 296/187.09 |
| 2008/0083498 | A1* | 4/2008 | Handing | B62D 27/026 156/322 |
| 2009/0265993 | A1* | 10/2009 | Shah | B60J 5/0416 49/352 |
| 2013/0088037 | A1* | 4/2013 | Schurter | B60J 5/0415 296/146.5 |

FOREIGN PATENT DOCUMENTS

| | | | | |
|---|---|---|---|---|
| DE | 198 06 761 | A1 | 8/1999 | |
| DE | 198 21 076 | B4 | 11/1999 | |
| DE | 198 50 150 | A1 | 5/2000 | |
| DE | 100 63 417 | A1 | 7/2002 | |
| DE | 10 2005 031 729 | A1 | 1/2007 | |
| DE | 10 2007 061 209 | A1 | 7/2009 | |
| DE | 102007061209 | A1 * | 7/2009 | ............ B60J 5/0466 |
| EP | 0 776 778 | A1 | 6/1997 | |
| EP | 0 818 339 | A1 | 1/1998 | |
| EP | 0 997 331 | A2 | 5/2000 | |
| JP | 2001-341529 | A | 12/2001 | |
| JP | 2001341529 | A * | 12/2001 | ............ B60J 5/0404 |
| JP | 3580225 | B2 | 10/2004 | |

OTHER PUBLICATIONS

"How does Forging Affect Grain Structure" <http://www.dropforging.net/how-does-forging-affect-grain-structure.html>, 3 pages (Year: 2017).*

Chinese Office Action issued in Chinese counterpart application No. 201380071164.7 dated Jul. 15, 2016, with partial English translation (Thirteen (13) pages).

PCT/EP2013/003747, International Search Report (PCT/ISA/220 and PCT/ISA/210) dated Apr. 8, 2014, with partial English translation, enclosing Written Opinion of the International Searching Authority (PCT/ISA/237) (Eleven (11) pages).

German Search Report dated Dec. 13, 2013, with Statement of Relevancy (Six (6) pages).

U.S. Appl. No. 14/761,898, "Roof Frame and Method for Producing a Roof Frame", filed Jul. 17, 2015, Inventor Michael Bendiks, et al.

Chinese Office Action issued in Chinese counterpart application No. 201380071164.7 dated Mar. 22, 2017, with partial English translation (Fourteen (14) pages).

* cited by examiner

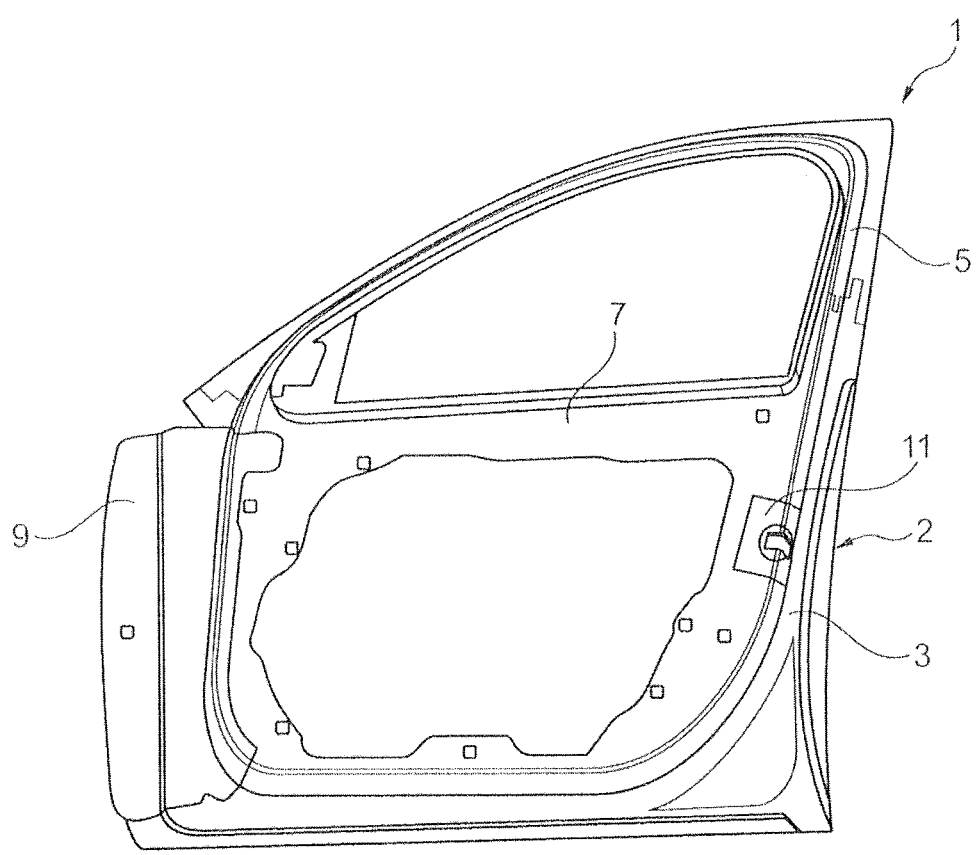

INTERMEDIATE SHELL FOR A MOTOR VEHICLE DOOR, METHOD FOR PRODUCING AN INTERMEDIATE SHELL, AND A DOOR FOR A MOTOR VEHICLE

BACKGROUND AND SUMMARY OF THE INVENTION

The invention relates to an intermediate shell for a motor vehicle door, a method for producing an intermediate shell for a motor vehicle door as well as a door for a motor vehicle.

Intermediate shells, methods for the production thereof and doors of the type discussed here are known. A corresponding door for a motor vehicle, in particular for a passenger motor vehicle, which is typically formed as a side door, has an intermediate shell on which an outer paneling is arranged on a first side and an inner shell is arranged on a second side which opposes the first side—seen in the transverse direction of the motor vehicle in the assembled state of the door on the motor vehicle. Therein, the inner shell typically serves for the arrangement of interior applications or interior applications are provided or formed on the inner shell. The intermediate shell is formed, as a rule, to be metallic. A side door for a motor vehicle having such an intermediate shell emerges from German publication DE 10 2007 061 209 A1, identified there as an interior door part, wherein the intermediate shell is formed as a frame part from a casting material. Alternatively, it is possible to produce the intermediate shell either in one piece as a pressed sheet metal part or from several individual components which are formed either as sheet metal parts or as casting parts. In order to be able to fulfill strength requirements provided, in particular, for an accident situation, in all of these variants either a wall thickness is increased consistently over the entire intermediate shell or additional components are attached which act as a door reinforcement. Both options are disadvantageous because both the consistently increased wall thickness and the additional reinforcement parts entail a relatively high weight of the intermediate shell and thus also the entire door. In addition to this, production from several individual components causes a plurality of joining operations, which is complex. In particular, complicated joining methods are necessary for production using a mixed construction method in order to be able to join components of different materials to one another. Furthermore, expensive reworking is necessary both in the case of casting and also sheet metal components.

The object of the invention is to create an intermediate shell for a motor vehicle door, a method for the production thereof and a door for a motor vehicle, wherein a high level of solidity, in particular accident stability, is possible without a great amount of effort and reworking, and wherein at the same time the concept of lightweight construction is taken into account.

This intermediate shell which is preferably provided for a side door of a motor vehicle is distinguished in that it is produced, at least in regions, from a light metal blank, by massive forming, preferably by forging. Massive-formed parts, in particular forged components, have increased mechanical strength compared to casting or sheet metal components. This is substantially because a fiber orientation in the component can be suitably designed or influenced during massive forming, in particular during forging. In particular, it is possible to collect fibers in determined regions, such that a particularly high level of mechanical strength results in these regions. It is thus possible to adjust the mechanical strength locally in the intermediate shell according to need. Therein it is, in particular, also possible to select a wall thickness or a cross-section of the intermediate shell during massive forming, in particular during forging, in a discontinuous manner and locally according to need, wherein regions with higher mechanical stress can be formed with larger wall thicknesses than regions with lower mechanical stress. At the same time, the fibers can be collected in regions with higher mechanical stress, such that these are able to be stressed to a particularly high level.

It has been shown that massive-formed, in particular forged, components are advantageous compared to casting components, especially in regions which have a larger wall thickness, because no risk of a cavity inclusion exists, wherein this risk increases for casting components having increasing wall thicknesses. In comparison to this, massive-formed, preferably forged, components comprise a very homogeneous, highly-compacted structure which has high strength and ductility. Due to these properties, it is overall possible to reduce the wall thickness of the massive-formed, preferably forged, intermediate shell in comparison to sheet metal construction methods or to the production as a casting component, such that the concept of lightweight construction is taken into account.

Especially due to the possibility to tailor the intermediate shell according to the stress and to adjust its mechanical strength and wall thickness in a locally differentiated manner, very large weight savings can be implemented. The slimmer design of the intermediate shell which is possible locally and also as a whole furthermore creates construction space. Additionally, a reduced reworking effort results in the case of an intermediate shell which is massive-formed, preferably forged, at least in regions, in comparison to a production as a sheet metal or casting part.

Previous, in particular conventional, joining methods can furthermore be used without a problem. Due to the massive forming, preferably forging, improved tensile strength, yield strength and elongation at break as well as ductility in particular result. At least with regard to the massive-formed, preferably forged, region of the intermediate shell, no casting tool, no specific joining device and only small amounts of reworking is required. Furthermore, functional integration during massive forming, in particular forging, is possible. Overall, weight and cost potentials thus result. Furthermore, an optimum design of the massive-formed, preferably forged, component for a performance during an accident is possible.

An intermediate shell is preferred which is distinguished in that it is produced from at least two components, wherein at least one component is produced from a light metal blank by massive forming, preferably by forging. The components are joined to one another, preferably by welding. The intermediate shell is preferably produced from a plurality of components. Particularly preferably, all components used are massive-formed, preferably forged, particularly preferably from the same material. In this case, no problems result during the production, in particular no problematic joints. In particular, mechanical weak points on the welding seams can be prevented. The different components are able to be connected using all conventional joining techniques, in particular in a non-positive, positive or firmly bonded manner, particularly preferably by screwing, riveting, clinching, soldering, gluing or preferably welding.

Alternatively, an intermediate shell is preferred which is distinguished in that it is produced in one piece as a massive-formed, preferably forged, component from a light metal blank. Herein, the advantages of the production by massive forming, preferably forging, affect the entire intermediate shell in a particularly distinctive manner. At the same time, a very high level of accuracy results due to the one-piece production because a tolerance chain is omitted via different components. Furthermore, otherwise necessary joining operations are omitted, which saves costs and is also logistically advantageous. Particularly preferably, the intermediate shell produced in one piece comprises an entire door frame, preferably having a window frame. Alternatively or additionally, it is possible for it to also comprise a belt line.

An intermediate shell is also preferred which is distinguished in that it comprises a light metal or a light metal alloy, preferably consists of a light metal or a light metal alloy. Particularly preferably, it comprises a material or consists of a material which is selected from a group consisting of aluminum, magnesium, an aluminum alloy and a magnesium alloy. Particularly preferably, the intermediate shell comprises an AlMgSi alloy or consists of this, wherein this is particularly preferably formed as a wrought alloy made from the 6000 or 6xxx series. The intermediate shell is preferably produced at least in regions from a light metal blank which comprises at least one of the materials referred to here, preferably consists of this.

An intermediate shell is also preferred which is distinguished in that at least one reinforcement element and/or at least one connection element to connect further components of a motor vehicle shell structure is/are forged on the intermediate shell, is/are forged to this and/or is/are forged into this. Therein the term "forged on" indicates that the at least one reinforcement and/or connection element is formed out of or formed in one piece from the formed material during forging. The term "forged to" indicates that the reinforcement and/or connection element is firstly provided separately from the material formed during forging, yet is connected or joined to this during the forging method by forging. Therein it is most preferably re-forged with the material in regions. Preferably, the at least one reinforcement and/or connection element has, for this purpose, at least one opening, through which the material of the light metal blank can pass during the forging process, wherein it is connected with the remaining, in particular opposing—seen in the direction of the opening—light metal material in a firmly bonded manner. Hereby, a particularly solid, firm and non-positive connection of the material of the light metal blank to the at least one reinforcement and/or connection element is caused. The term "forged into" indicates, in particular with regard to a reinforcement element, that this is completely re-forged with the material of the light metal blank. After the forging process, the reinforcement element is, in this case, arranged completely within the forged component.

The at least one reinforcement element is preferably formed as a reinforcement part for a door lock, a door hinge and/or a console for side impact protection, in particular a side impact brace. The at least one connection element is preferably formed as a flange, console, flux or screw connection point, in particular for the production of a joint with adjacent elements of the motor vehicle shell structure. In particular, if such a connection element is formed in one piece with the massive-formed, preferably forged, region of the intermediate shell or also with the one-piece massive-formed or forged intermediate shell, functional integration results which entails weight and cost advantages as well as increased strength. Furthermore, it is possible to save production steps, in particular joining steps.

The object is also solved by a method for the production of an intermediate shell for a motor vehicle door. The method in particular serves for the production of an intermediate shell for a side door of a motor vehicle, especially of an intermediate shell according to one of the exemplary embodiments described above. The method is distinguished in that the intermediate shell is produced at least in regions from a light metal blank by massive forming, preferably by forging. Therein the advantages result which have already been stated in connection with the intermediate shell.

It is also advantageous in the production of the intermediate shell at least in regions by massive forming, preferably by forging, that an increase in strength and ductility results due to a strain hardening of the light metal material used. Overall, a ductile lightweight component having high strength and ductility is produced.

Preferably, the intermediate shell is produced at least in regions by warm forging. This involves the working temperature for the forming preferably being below a recrystallisation temperature of the processed material. An advantage herein is that no or only a low level of scaling on a surface of the material takes place. Comparably low dimensional tolerances are able to be presented. Alternatively, it is preferred that the intermediate shell is produced at least in regions by hot forging. This involves the working temperature during the forming preferably being above a recrystallisation temperature of the material. It is herein advantageous that comparably low forming forces are required.

Preferably, in connection to the massive forming, in particular in connection to the forging, a heat treatment is implemented wherein the component properties can be adjusted optimally and according to need via the heat treatment process.

A method is preferred which is distinguished in that the intermediate shell is produced in one piece as a massive-formed, preferably forged component. Therein, it is preferably produced as an entire door frame, preferably including a window frame and/or a belt line. This is particularly advantageous because joining operations and production steps are omitted and because particularly low tolerances are able to be presented because a tolerance chain is omitted due to the joining of different elements.

Alternatively, it is preferred that the intermediate shell is joined from at least two, preferably from a plurality of components. Therein at least one component is produced from a light metal blank by massive forming, preferably by forging. Particularly preferably, all components are produced from a light metal blank by massive forming, preferably by forging. The components are preferably joined to one another by welding. Alternatively or additionally, other joining methods are also possible, wherein the components are connected to one another, preferably in a non-positive, positive and/or firmly bonded manner, in particular by screwing, riveting, clinching, soldering or gluing, or in another suitable manner.

A method is also preferred which is distinguished in that a light metal blank is used which comprises a light metal or a light metal alloy, preferably consists of a light metal or a light metal alloy. Preferably, a material is used which is selected from a group consisting of aluminum, an aluminum alloy, magnesium, a magnesium alloy and an AlMgSi alloy. Particularly preferably, a wrought alloy made from the 6000 or 6xxx series is used.

A method is also preferred which is distinguished in that at least one reinforcement element and/or at least one connection element to connect further components of a motor vehicle shell structure is/are forged on the intermediate shell, is/are forged to it and/or is/are forged into this. Therein the term "forged on" indicates that the at least one reinforcement and/or connection element is formed from the formed material during forging. The term "forged to" indicates that the at least one reinforcement and/or connection element is firstly provided separately from the material which is formed during forging, wherein it is joined to the formed material during the forging and by forging, in particular it is re-forged with this material. Therein at least one opening is provided on the at least one reinforcement and/or connection element, through which the formed light metal material passes in the forging process, such that it is connected firmly to the light metal material arranged there on a side opposing the opening. Hereby a firm and non-positive, particularly solid connection of the light metal material to the at least one reinforcement and/or connection element is able to be caused. Preferably, reinforcement parts for a door lock, a door hinge and/or a console for a side impact protection, in particular a side impact brace, are provided on the intermediate shell in one of the described manners.

Embodiments of the method are, in particular, preferred which are distinguished by at least one method step which is provided by at least one device feature described in connection with the intermediate shell, preferably combinations hereof, caused by or with respect to the implementation thereof. Conversely, exemplary embodiments of the intermediate shell are preferred which have at least one feature which results from or is caused by at least one method step disclosed in the scope of the method, preferably combinations hereof. In this respect, the description of the intermediate shell and the description of the method are to be understood as complementary to each other.

The object is finally also solved by a door for a motor vehicle. The door is, in particular, formed as a door of a passenger motor vehicle, preferably as a side door. It has an intermediate shell on which an outer paneling is arranged on a first side and an inner shell is arranged on a second side which opposes—seen in the transverse direction—the first side, the inner shell preferably having interior applications or being provided for the arrangement of interior applications. Therein the transverse direction preferably indicates, on the one hand, a transverse direction of the door itself and, on the other hand, a transverse direction of a motor vehicle, on which the door is assembled according to provisions. In the assembled state of the door on the motor vehicle according to provisions, the transverse directions thereof are aligned in parallel to each other. The intermediate shell preferably virtually forms a carrier, for the outer paneling on the one side and for the inner shell on the other side. The door is distinguished in that the intermediate shell is produced at least in regions from a light metal blank by massive forming, preferably by forging. Particularly preferably, the intermediate shell is formed as an intermediate shell according to one of the exemplary embodiments described above and/or is produced according to one of the exemplary embodiments of the method described above.

Thus, the same advantages are achieved in connection with the door, which have already been described in connection with the intermediate shell and the method.

The invention is described in greater detail below by means of the drawing.

BRIEF DESCRIPTION OF THE DRAWING

The single FIGURE shows a schematic view of one exemplary embodiment of an intermediate shell for a motor vehicle door.

DETAILED DESCRIPTION OF THE DRAWING

The single FIGURE shows a depiction of an exemplary embodiment of an intermediate shell 1 for a motor vehicle door, wherein the intermediate shell 1 is formed for the side door of a passenger motor vehicle.

The intermediate shell 1 comprises a door frame 2 or a lower frame part 3, a window frame 5 as well as a belt line 7.

Preferably, the intermediate shell 1 is forged in one piece from a light metal blank, wherein the lower frame part 3, the window frame 5 and the belt line 7 are formed from the light metal blank during forging. Therein, the intermediate shell 1 is particularly preferably produced by die forging, in particular by forming of the light metal blank between an upper and a lower die block.

Preferably, a hinge reinforcement 9 and a lock reinforcement 11 are forged to the intermediate shell 1, wherein these are preferably re-forged in regions with the material of the intermediate shell 1.

Alternatively, it is possible for the hinge reinforcement 9 and the lock reinforcement 11 to be forged in one piece on the intermediate shell 1.

Overall it is gleaned that an intermediate shell 1 is able to be produced by means of the method which has improved component properties with regard to its tensile strength, yield strength, elongation at break and ductility, wherein at the same time lightweight construction can be operated. Thus it is possible to produce a particularly light and at the same time stable door for a motor vehicle without a great effort and without extensive reworking.

The invention claimed is:
1. A method for producing an intermediate shell for a side door of a motor vehicle, comprising the steps of:
producing the intermediate shell in one piece from a metal blank by forging, wherein the intermediate shell includes a lower frame part, a window frame, and a belt line;
locally adjusting a mechanical strength in the intermediate shell in a region by collecting fibers in the region during the forging, wherein the mechanical strength of the region is greater than a mechanical strength of another region of the intermediate shell; and
forging on the intermediate shell a side impact brace and a connection element.
2. The method according to claim 1, wherein the metal blank is a metal alloy.

* * * * *